United States Patent [19]

Casey

[11] Patent Number: 4,854,429

[45] Date of Patent: Aug. 8, 1989

[54] VARIABLE RATE SHOCK ABSORBER AND SYSTEM THEREFOR

[76] Inventor: Gary L. Casey, 3173 Roxbury, Troy, Mich. 48084

[21] Appl. No.: 134,497

[22] Filed: Dec. 18, 1987

[51] Int. Cl.$^4$ .............................................. F16F 9/46
[52] U.S. Cl. ................................. 188/299; 188/319;
188/322.15; 137/599.2; 251/129.15; 280/714
[58] Field of Search .................. 188/319, 299, 322.15;
280/714; 137/599.2; 251/129.15

[56] References Cited

U.S. PATENT DOCUMENTS

| | | |
|---|---|---|
| 2,507,276 | 5/1950 | Skwaryk . |
| 2,780,321 | 2/1954 | Sturari . |
| 2,846,028 | 3/1955 | Gunther . |
| 3,011,751 | 12/1961 | Delany et al. . |
| 3,039,566 | 6/1962 | Rumsey . |
| 3,603,612 | 9/1971 | Hill . |
| 4,031,989 | 6/1977 | Biazquez . |
| 4,463,839 | 8/1984 | Ashiba . |
| 4,598,929 | 7/1986 | Kumagai et al. . |
| 4,600,215 | 7/1986 | Kuroki . |
| 4,624,282 | 11/1986 | Fargo . |
| 4,635,765 | 1/1987 | Schmidt . |
| 4,638,896 | 1/1987 | Poyser . |
| 4,682,675 | 7/1987 | Eddy, Jr. . |

FOREIGN PATENT DOCUMENTS

| | | |
|---|---|---|
| 2911768 | 10/1980 | Fed. Rep. of Germany . |
| 3518327 | 11/1986 | Fed. Rep. of Germany . |
| 315917 | 7/1929 | United Kingdom . |
| 810836 | 3/1959 | United Kingdom . |
| 2159234 | 11/1985 | United Kingdom . |
| 2159604 | 12/1985 | United Kingdom . |
| 2164120 | 3/1986 | United Kingdom . |
| 2164723 | 3/1986 | United Kingdom . |

*Primary Examiner*—George E. A. Halvosa
*Attorney, Agent, or Firm*—Markell Seitzman

[57] ABSTRACT

The invention describes an electrically controllable mono-tube shock absorber wherein the damping of the shock absorber is controlled by a solenoid valve. The valve includes a poppet valve which is mechanically independent of an electrically actuated armature. A second valve is also disclosed which includes a poppet valve having a cylindrical wall which prevents the poppet valve from contacting the armature. A third valve, carried by the shock absorber piston includes two axially extending passages one of which cooperates with a poppet valve to increase fluid flow thereacross to reduce damping. Each valve can be actuated in accordance with the direction (sign) of a derived velocity signal.

18 Claims, 3 Drawing Sheets

VARIABLE RATE SHOCK ABSORBER AND SYSTEM THEREFOR

The present invention relates to an electrically responsive, variable rate shock absorber.

Conventional shock absorbers are designed to provide low damping during compression and high damping during extension. The low damping, while desirable for driver comfort, detracts from drivability. To provide for increased drivabiity it is desirable to quickly dampen vehicle oscillation.

It is desirable to be able to adaptively vary the damping characteristics of the various shock absorbers of a vehicle to improve its driveability and provide for increased passenger comfort. It has been suggested by prior systems that vehicle motion can be controlled by varying shock absorber damping accordance with the vertical velocity of each wheel. Such control requires a plurality of sensors, at least one for each wheel, i.e. wheel and/or wheel-axle combination. If the wheel motion is to be controlled, in a real time manner, the sensors and related electromechanical devices must have a relatively high frequency response thus increasing system cost.

U.S. Pat. No. 4,463,839 by Masahiro is illustrative of an electrically controlled harmonic damper or shock absorber having a solenoid in the piston of the shock absorber. Offenlegugsschrift 29 11 768 shows an electrically controlled mon-tube shock absorber.

It is an object of the present invention to improve driveability and driver comfort. Another object of the present invention is to provide a variable rate shock absorber for a vehicle to permit such improvement. An additional object of the present invention is to control the shock absorber in a simple and straightforward manner in order to dampen the oscillatory motion of the vehicle.

Accordingly, the invention comprises:

A shock absorber for a vehicle comprising: a casing, a hollow strut reciprocatively received in the casing, a piston including an opening therethrough, carried by the strut for diving the interior of the casing into upper and lower chambers containing fluid, a plurality of flap valves for damping the motion of the strut at predetermined levels in extension and compression. The strut further includes a cross-hole for communicating fluid between the upper chamber and the interior of the strut, means for selectively reducing the predetermine damping levels comprising: solenoid valve means positioned within and carried by the strut including: main valve which includes an armature movaable in response to an electromagnetic force to selectively open and close a first flow passage, the first flow passage being formed within a cross-member of a retainer. The retainer cooperates with the interior of the strut to define a first fluid chamber about the armature and a second fluid passage in communication with the first fluid chamber. The retainer further includes a wall which is recessed from the interior of the strut and which extends axially away from the first fluid chamber and includes an open end. The solenoid valve means further comprises a valve seat member defining a lower passage for commumicating fluid between the lower chamber, through the piston opening, and the interior of the strut, and includes at one end thereof a second valve seat. The shock absorber further includes a poppet valve, movable in response to a pressure differential thereacross, relative to the second valve seat for controlling the flow of fluid through the lower passage, including a cylindrical wall slidably received in the retainer wall and a bottom formed at one end of the cylindrical wall including a narrow bleed passage therethrough, wherein the bleed passage is narrower than the second fluid passage of the retainer. The retainer and poppet valve cooperate to define a pressure chamber therebetween, wherein when the pressure of the fluid in the lower chamber is greater than the pressure in the upper chamber, and with the armature deactivated and positioned on the first valve seat, fluid within the lower chamber is permitted to migrate through the bleed passage into the pressure chamber to develop a force on the poppet valve urging it onto the second seat. When the armature is activated and positioned off of the first seat, fluid in the pressure chamber is communicated to the first chamber creating a pressure differential across the poppet valve urging it off from its seat permitting flow from the lower chamber to the upper chamber to thereby lessen the damping of the strut from the predetermined levels. When the pressure in the upper chamber is greater than the pressure in the lower chamber with the armature activated and positioned on the first valve seat, to prohibit flow through the second fluid passage, the increased pressure fluid acts upon the bottom of the poppet valve to urge same from the second valve seat to permit fluid to flow from the upper chamber to the lower chamber through lower passage in the valve seat. With the armature activated and position off of the first valve seat pressurized fluid is permitted to flow through the second fluid passage into the pressure chamber to urge the poppet valve onto the second valve seat to restrict flow through the lower passage. The shock absorber can also be controlled by generating a first signal indicative of the vertical acceleration of the vehicle and by deriving, from the first signal, a second signal indicative of vehicle vertical velocity. The solenoid valve means is activated and deactivated based upon the sign of the velocity signal.

Many other objects and purposes of the invention will be clear from the following detailed description of the drawings.

BRIEF DESCRIPTION OF THE DRAWINGS

In the drawings:

FIG. 5 is a cross-sectional view of another embodiment of a shock absorber.

DETAILED DESCRIPTION OF THE DRAWINGS

Figures 1, 2:
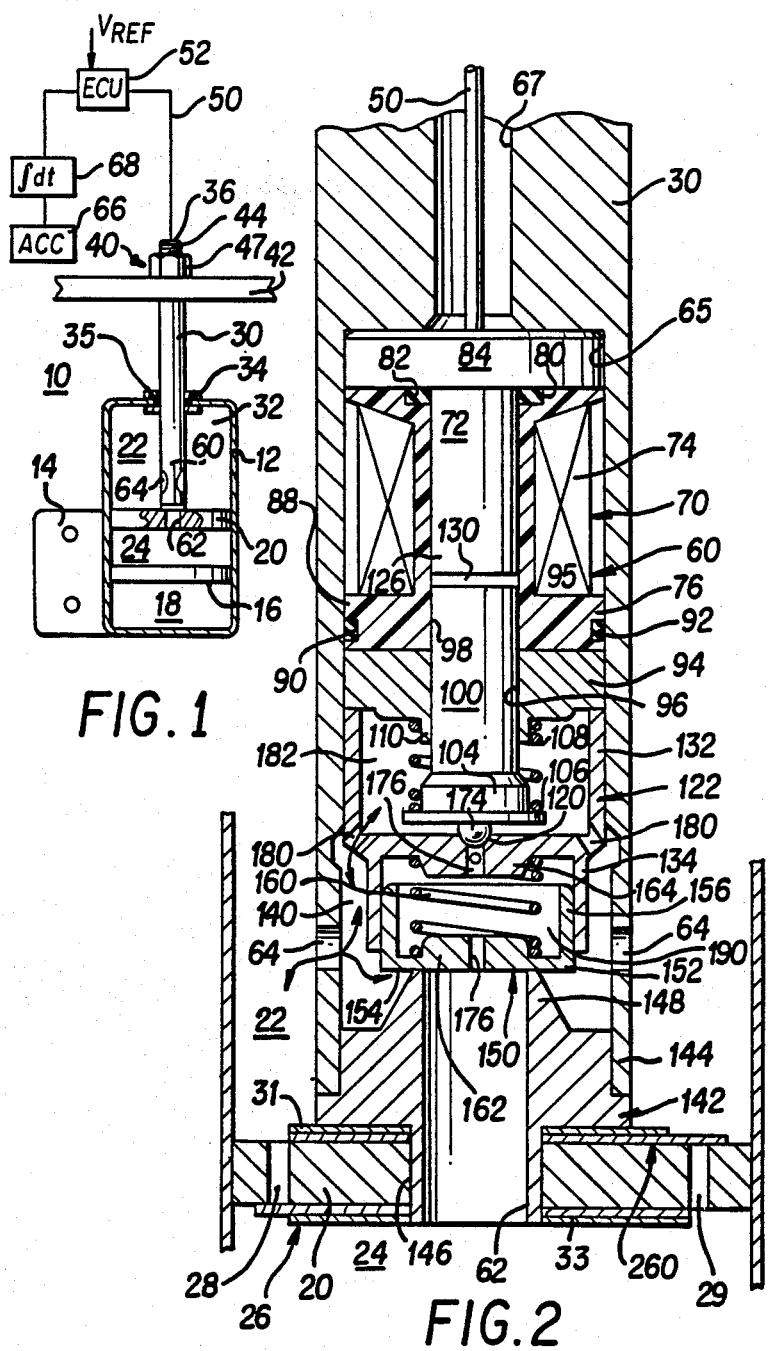
FIG. 1 schematically illustrates the present invention.
FIG. 2 illustrates a cross-sectional view showing many of the major components of a shock absorber employing the present invention.

The variable rate shock absorber 10 shown in FIGURE 1 is a mono-tube type of shock absorber comprising an outer cylinder or casing 12 adapted to be secured to the unsprung mass of the vehicle such as a wheel or axle assembly by a bracket generally designated as 14. As is known in the art various attachment mechanisms can be substituted for the bracket 14. Typically shock absorbers of the type shown include a diaphgragm 16 which encloses a gas filled chamber thereof forming an accumulator 18. Slidably received within the cylinder 12 is a piston 20 which separates the cylinder 12 into upper 22 and lower 24 fluid filled chambers containing a hydraulic fluid. Flap valves 26 and 26a (see FIG. 2), of known construction are positioned on either side of the piston 20. The flap valves open and close one or the other of the narrow passages 28 and 29 to permit fluid to move between the chambers as the piston 20 moves up and down within the casing 12. The openings 28 and 29 and associated springs 31 and 33 constitute a throttle to dampen the motion of the piston 20 in a known manner. The piston 20 is moved by a strut 30 which extends through one end 32 of the casing 12. A seal 34 is disposed within an opening 35 in an end 32, of the strut 30, to prevent fluid from leaking out from the casing 12. The upper end 36 of the strut 30 is provided with means, generally shown as 40, for securing same to the sprung mass or vehicle body 42. Such means may include a narrow threaded portion 44 received through a portion of the vehicle body and secured thereto by a nut 47. The strut 30 is preferably hollow to receive an electrical wire or cable 50. The cable 50 is connected to an electrical control unit (ECU) 52.

Situated within the strut 30, proximate the piston 20, is a valve generally shown as 60, such valve 60 is not visible in FIG. 1 but is shown in detail in FIGURE 2. As explained below the valve 60 modifies the damping characteristics of the shock absorber 10 from that established by the flap valves 26 and 26a. A first opening 62 is provided through the piston 20 for communicating fluid from chamber 24 to the valve. The strut 30 further includes a plurality of openings or cross-holes 64 for communicating the upper chamber 22 to the valve 60. It is contemplated that the valve 60 has a bi-direction flow capability for permitting fluid to flow between passages 62 and 46 and the chambers 22 and 24 in order to change the overall damping characteristics of the shock absorber in response to a control signal. By controlling the effective fluid flow rate between chambers 22 and 24 the rate at which the piston 20 moves and hence the damping of the piston 20 can be varied. Additionally, by using the bi-directional valve 60 a relatively simple control philosophy can be used to stabilize the vertical oscillations of the vehicle. As an example, such control philosophy may employ an accelerometer 66 mounted to the vehicle and an integrator 68 used to obtain a velocity signal. After determining the direction of the velocity signal, the valve 60 can be appropriately opened and closed to vary the damping rate of the shock absorber 10 to dampen the vehicle vertical acceleration to zero.

Reference is again made to FIG. 2 which illustrates a more detailed view of the solenoid valve 60 and shock absorber 10. As shown, the solenoid valve 60 is situated within a stepped bore 65 of the strut 30. The electrical wire/or cable 50 extends from the valve 60 through an axial passage 67. The valve includes a solenoid assembly generally shown as 70 comprising a stator 72 positioned within a coil 74 which may be wound about a plastic bobbin 76. An upper flange 78 of the bobbin includes a groove 80 for an O-ring 82 which bares against a radially extending flange 84 of the stator 72. The coil 74 is connected to the wire 50. The lower flange 76 of the bobbin may also include, at a circumferential edge 88 thereof, an annular groove 90 for receiving another O-ring 92. The O-ring 92 is urged against the inner wall of the strut 30 to prevent fluid from entering the coil space. Positioned below the flange 76 of the bobbin is a flux plate 94. The flux plate 94 includes a central opening 96 which is a coaxially disposed relative to a passage 98 in the bobbin 76. The solenoid assembly 70 further includes an armature 100 which is slidably received through the opening 96 of the flux plate 94 and partially extends, at one end 95 thereof, into the passage 98. The armature 100 further includes an enlarged end 104 defining a flange 106 for receiving a spring 108. The spring 108 is also received about a shoulder 110 formed in the flux plate and biases the armature outwardly from the stator 72 towards a valve seat 120 formed in a retainer 122.

The retainer 122 comprises a base plate 124 which is maintained by a wall 132, a fixed distance from a lower end 126 of the stator such that when the armature is urged between the base plate 124 an air gap 130 is formed between the armature 100 and stator 72. The wall 132 is tightly received relative to the inner wall of a bore 65. The retainer 122 further includes a second cylindrical wall 134 extending from the bottom of the plate 124 and is oppositely directed relative to the wall 132. The diameter of the wall 134 is preferably narrower than the inner wall of the strut and forms, in corporation with the strut, an annular fluid passage 140. The strut, proximate the annular fluid passage 140, includes the openings 64 which, as previously mentioned, permit communication of hydraulic fluid between the chamber 22 and the valve 60.

Positioned below and spaced from the retainer 122 is a valve seat member 142 which joins the lower end 144 of the strut to the piston 20. The valve seat member 142 is received within an opening 146 within the piston 20 and defines the passage 62. The valve seat member further includes a valve seat 148 which as illsutrated, comprises a flat, annular seating surface, the inner and outer diameters of which are preferably less than the inner diameter of the wall 134.

Slidably positioned within the walls 134 of the retainer 122 is pressure (force) responsive poppet valve 150. The poppet valve 150 includes a bottom member 152, the lower surface 154 of which forms a closure surface for seating upon the valve seat 148. The poppet valve further includes a wall 156 axially extending from the bottom 152 and sized to slidably engage the inner portion of the wall 134. One end of a spring 160 is received about a boss 162 formed in the bottom 152 of the poppet valve 150 and is received, at another end thereof, about another boss 164 axially extending from the base plate 124.

Extending through the base plate 124 and boss 164 of the retainer 122 is a flow passage 170 which terminates at the valve seat 120 and which is adapted to receive a valve closure element 174 such as a ball carried by the armature 100. The bottom 152 and boss 162 of the poppet valve 150, additionally include a bleed passage 176 which is preferably narrower than the flow passage 170 as well as the passages 28 and 29. The retainer 122, proximate its base plate 124, includes a plurality of passages generally shown as 180 for communicating fluid received at the annular fluid passage 140 to a fluid chamber 182 formed by the retainer 122 and flux plate 94. Further, the retainer 122, and more specifically, the wall 134 and the poppet valve 150 cooperate to define a pressure chamber 190. As can be seen the poppet valve 150 forms a movable wall of such pressure chamber 190.

The damping of a normal shock absorber, is typically controlled by mechanisms similar to the flap valves 26 shown in FIG. 2. The various springs and passages of these flap valves are typically sized such that the shock absorber is stiff in extension and soft in compression in an attempt to achieve a blend between controllability and drive comfort. As previously mentioned, it is one object of the present invention to enhance driveability while not sacrificing driver comfort. This is accomplished by reducing the vertical velocity of the vehicle to zero by controllably varying the damping of the shock absorber. More specifically, the solenoid valve of each shock absorber is controlled such that the shock absorber is in a high damping mode whenever the vehicle is moving upwardly or downwardly. Control of the vehicle motion can, most simply be accomplished by simultaneously or selectively activating and/or deactivating each solenoid valve 60 within each of the corresponding shock absorbers 10 in response to the output of a single accelerometer 66 or set of accelerometers such that when the vehicle moves upwardly the solenoic valve(s) 60 is activated and when the vehicle moves downwardly the solenoid valve(s) is deactivated to achieve the desired effect of increased damping. As will be seen from the discusson below, it is not necessary to be concerned with nor monitor the rapid motions of the various unsprung masses since their motions will automatically be damped by the action of the shock absorbers as described below.

It may be helpful to refer to the table below, which shows the various states of the solenoid valve 60, and its effect upon damping as a function of the compression and/or extension of the shock absorber 10.

| MOTION | VALVE 60 | EFFECTIVE DAMPING |
| --- | --- | --- |
| Extension | OFF | LOW |
|  | ON | HIGH |
| Compression | OFF | HIGH |
|  | ON | LOW |

When the vehicle moves upwardly the vehicle its velocity is positive ($v \geq 0$) and the shock absorber will be in extension (unless the unsprung mass has a higher positive vertical velocity). Further, if the solenoid is ON the effective damping as HIGH. Similarly when the vehicle moves downwardly its velocity is negative ($v \leq 0$) and the shock absorber will be in compression (unless unsprung mass has higher negative velocity). If the solenoid is deactivated, i.e., turned OFF, the damping is correspondingly HIGH.

The control of the vehicle is accomplished by generating a signal indicative of vehicle velocity such as by measuring vertical acceleration with the accelerometer 66 and generating a signal indictive of the vehicle velocity v. One such means of obtaining velocity is to integrate the output from the accelerometer 68 (FIG. 1). The velocity signal, is communicated to the ECU 52, of a known variety, wherein it is compared to a reference which causes the ECU 52 to generate a control signal activating and/or deactivating the coil 74. Control of the vehicle acceleration of the vehicle may be accomplished by incorporating within the ECU logic such that when the vertical velocity is greater than or equal to zero ($v \geq 0$) or some predeteremined deadband the solenoid valve 60 is OFF and when the velocity is less than zero ($v < 0$) or some predetermined deadband the solenoid valve is turned ON. In this manner, the damping rate of the shock absorber can selectively be made stiff in either extension and/or compression.

The mechanism for obtaining this damping control cna be understood by considering the two operational modes of the solenoid valve 60 which may be selectively entered in correspondence with the velocity signal and ECU generated control signal.

The two operation modes are (a) an active mode wherein a control signal is communicated to the coil 74 thereby causing the armature 100 to retract from the valve seat 120 permitting a restricted fluid flow the passages 176 and 180 and (b) a deactivated mode wherein continued flow through these passages is prohibited.

Consider the situation wherein the strut 30 is being moved out of the casing 12 as the vehicle moves upwardly. Such movement of the strut 30 and piston 20 compresses the fluid within chamber 22 causing the fluid to flow through the passages 28 to the flap valve 26. The now higher pressure fluid in chamber 22 also acts upon the bottom 154 of the poppet valve 150. Similarly, the lower pressure fluid in chamber 24 is communicated to passage 62. It can be seen that the pressure within the chamber 190 will stabilize at approximately the reduced pressure of the fluid within the lower chamber 24 by virtue of communication through the bleed passage 176. If the solenoid valve 60 is not activated (OFF) the pressure differential across the poppet valve 150 will urge it from valve seat 148 permitting a large volume of fluid to flow from the upper chamber 22, through passages 64 and 104 and into the lower chamber 24 through passage 62. As such, with the piston 20 moving upwardly and the solenoid valve 60 closed or OFF the damping of the shock absorber 10 is reduced from the higher damping set by the flap valve 26 by virtue of the increased flow.

Upon energizing the solenoid valve 60 the higher pressure fluid in the upper chamber 22 flows through passages 64, 140 and 180 into the pressure chamber 182 and thereafter into the pressure chamber 190 through passage 170. The now higher pressure in chamber 190, in concert with the spring 160 urges the poppet valve 150 onto its seat restricting the fluid flow between chambers 22 and 24. It should be recalled that the passage 176 is preferably narrower than the passage 170. As can be seen, during this period, fluid is permitted to flow ito the lower chamber 24 through the narrow bleed passage 176. However, since the flow through the valve 60 is severely restricted the damping of the shock absorber will be at the increased (HIGH) damping level as substantially established by the flap valve 26.

In a similar manner it can be seen that as the piston 20 moves down in the casing 12 the lower chamber 24 will be pressurized. The fluid under pressure will migrate through passages 62 and 176 into the pressure chamber 190. If the solenoid valve is OFF, a pressure or force differential is created across the poppet valve 150 to urge it onto its seat 148 which severely restricts the further flow of fluid between the upper and lower chambers. With flow through the poppet valve essentially terminated the shock absorber damping will increase to a value substantially set by the flap valve 26a. Upon activation (ON) of the solenoid valve 60, the closure element 174 is moved from its valve seat 120 permitting increased fluid flow between the upper and lower chambers 22 and 24 through passages 62, 176, 170, 180, 140 and 64. Thereafter, the pressure in chamber 190 will tend toward the now lower pressure in the upper chamber 22 thereby creating a pressure or force differential across the poppet valve to urge it off from its seat, increasing the flow through the valve and reducing the damping of the shock absorber 10.

As mentioned above, an advantage of a control system using the present invention is that the vertical motion of the wheels need not be measured in order to correct and stabilize the motion of the vehicle. This can be seen from the following example: Assume that the control system has stabilized the vehicle vertical velocity (v=0). If during this condition the solenoid valve(s) 60 is activated, then if a particular wheel momentarily falls into a hole the shock absorber will extend. From the above table it can be seen that the damping of the shock absorber will be HIGH and will generate a force resisting the wheels' tendency to fall into the hole. If on the other hand, a particular wheel rolls over a bump it is desirable to isolate its upward motion from the vehicle. This is automatically accomplished since during compression, with the solenoid valve ON, a low damping force is created, thereby effectively isolating the vehicle from the upward motion of the wheel.

One of the advantageous features of the present invention is the ability of the solenoid valve to vary the damping of the shock absorber during all operative conditions. Implicit in the solenoid valve design is the isolation of the operation of a main electrically controlled valve i.e. the armature and associated components from the movement of the poppet valve 150. In prior electrically controlled poppet valves it is possible under certain high pressure conditions for the poppet valve to move against the main valve. This contact limits the motion of the poppet valve and essentially makes it inoperative. Such a situation cannot occur in the present invention.

Figure 3:
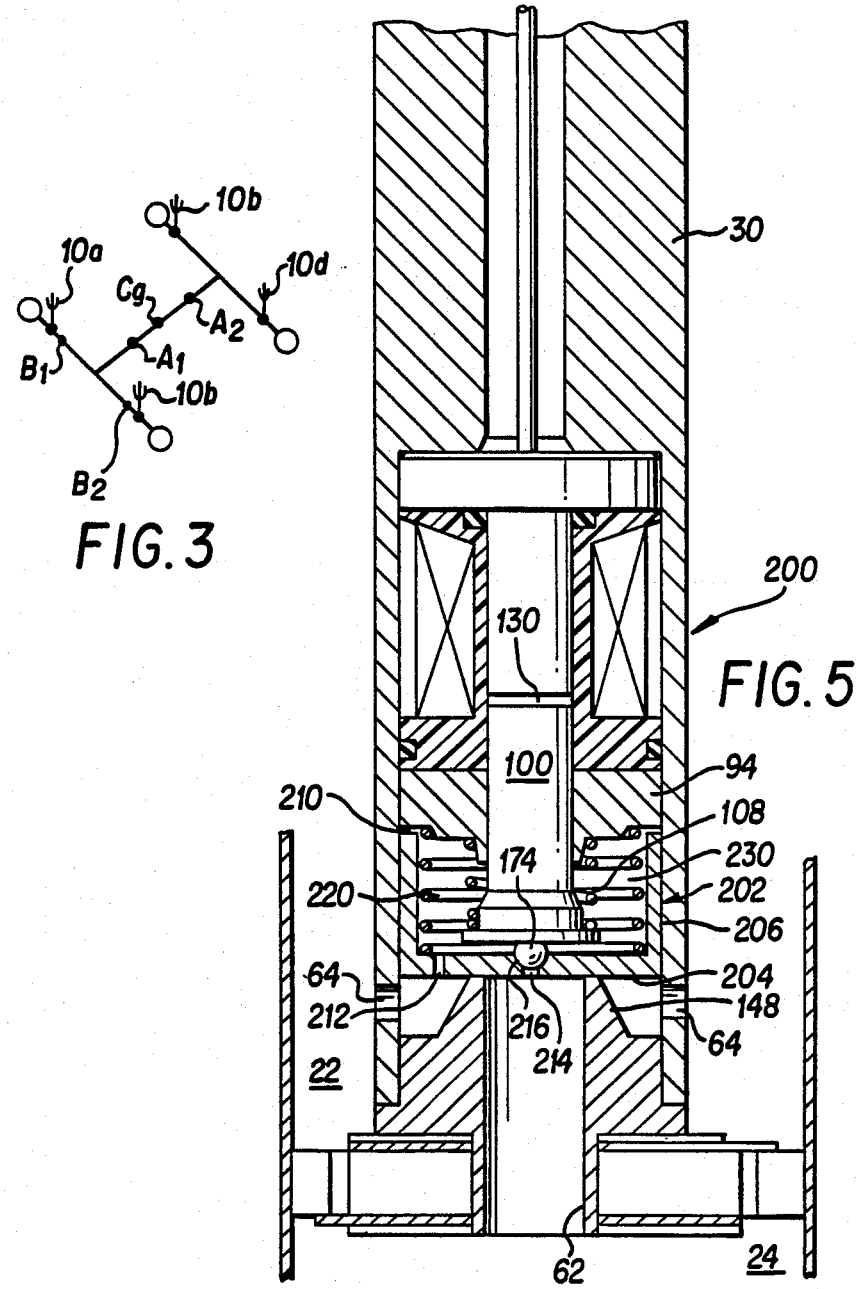
FIG. 3 shows the location of vehicle mounted sensors.

The above described control system uses in its most simple form a single accelerometer to control the vertical velocity of the vehicle. In certain situations it may also be desirable to control the pitch and roll motions of the vehicle as well. This can simply be accomplished by adding additional sensors to the vehicle. As an example, pitch and vertical control can be affected by using accelerometers, positioned along or parallel to the axis of the symetry of the vehicle at locations $A_1$ and $A_2$ as shown in FIG. 3. Full control of the vehicle's motion (vertical, pitch and roll) can be achieved by using accelerometer at locations $B_1$, $B_2$ and $A_2$ which may be used to control the front, (10a, 10b) and rear, (10c, 10d) shock absorbers.

Figure 4:
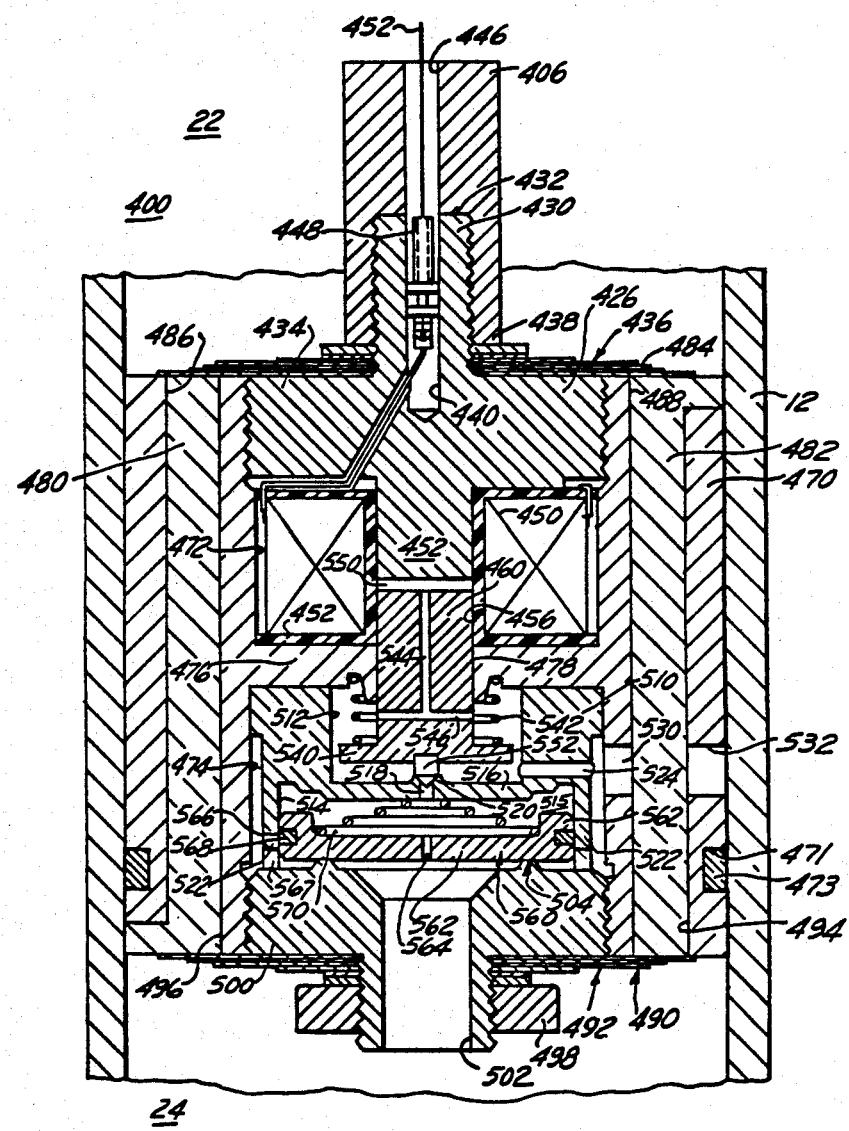
FIG. 4 illustrates a cross-sectional view of an alternate embodiment of a shock absorber.

FIG. 4 illustrates another embodiment of the invention. A strut 406 is received within a casing 12 in the same manner as is the shock absorber of FIGURE 1. Threadably received within a lower portion of the strut 406 and slidably received in the casing is a piston assembly generally shown as 420. The piston assembly divides the casing into upper 22 and lower 24 fluid filled chambers.

The piston assembly comprises a piston housing 470 including first and second stepped bores 472, 474. A cross member 476 having an opening 478 separates the bores 472 and 474. A solenoid assembly 422 is received in the piston housing 470. The solenoid assembly includes stator 426 threadably received in the bore 472. The stator defines an axially projecting member 430 extending from a radial flange 434, that is received within a portial bore 432 of the strut. A first flapper valve 436 is sandwiched between a lower portion 438 on the strut, the stator flange 434, and piston housing 470. The stator supports a connector assembly 448 within a blind bore 440. The bore 440 is coaxially positioned relative to a bore 446 which runs the length of the strut 406. The connector assembly 448 joins the ends of the wires of a coil 450 to another wire or cable 452 adapted to receive control signals. The coil 450 encircles an opposite extending member 452 of the stator. The coil is wound about a bobbin 454 which forms a passage 456 for receipt of an armature 460 such passage coaxial to the opening 478.

The piston housing 470 further includes, in an outer portion thereof, an annular groove 471 for receipt of a dynamic seal such as a piston ring 473. The piston housing 470 additionally includes miltiple axial flow pasasges 480 and 482 respectively. The springs 484 of the flap valve 436 are positioned about the top end 486 of passage 480 to controllably restrict flow from the lower chamber 24 to the upper chamber 22 and to prohibit flow in the reverse direction. The portion 496 of passage 480 proximate the lower chamber is open to fluid flow. Another flap valve 490 is positioned upon the lower end of the piston housing 470, such flap valve 490 also includes a plurality of springs 492 closing lower portion 494 of passage 482 to controllably restrict flow from the upper chamber to the lower chamber and to prohibit flow in the reverse direction. The upper portion 488 of passage 482 is open to flow from the upper chamber 22.

A valve seat assembly generally shown as #500 is threadably received into the bore 474. The lower flap valve 490 can be appropriately secured to the valve seat assembly 500 and housing 470 by means of a retainer 498. The valve seat assembly includes a central bore or flow passage 502 and an annular upraised valve seat 504 which preferably defines a flat seating surface.

Positioned between the valve seat assembly 500 and the cross member 476 of the piston housing is a retainer generally shown as 510. The retainer is preferably manufactured of a hardened steel and includes upper 512 and lower 514 bores separated by a cross member 516 which includes a flow passage 518. Situated about the passage 518 or formed as a part thereof is valve seat 520 which is preferably conically shaped. The lower bore 514 is formed by a cylindrical, axially extending wall 522. The wall 522 is preferably spaced from the inner walls of the bore 474. A relief passage 524 is formed in the retainer to communicate the bore 512 with the annular space 525 between the wall 522 and the bore 474. Also formed proximate the relief passage 524, within a portion of the piston housing 470, is an opening 530. The opening 530 communicates the space 525 and passage 482. Also formed within the piston housing 470 is a passage 532 which is a drill passage used to fabricate passage 530 and may be thought of as an extension of passage 530. The retainer further includes a plurality of opening 567 to permit fluid to flow to and from the space 525 into the cavity 514.

As previously mentioned as armature 460 is reciprocatively received within the opening 478 of the piston housing and within passage 456 of the bobbin 454. The armature includes a flange 540 adapted to receive a bias spring 542. The armature further includes an axially directed passage 544 which is communicated to bore 512 through a cross passage 546. The purpose of the passages 544 and 546 is to provide a leakage path for fluid which may become trapped within an air gap 550 formed between the stator 426 and the armature 460. Entrapped fluid in the air gap will modify the damping of the armature 460. Further, to enhance the magnetic qualities of the electromagnetic valve formed by the armature, stator and coil, the armature 460 is preferably fabricated of a silicon type iron and the stator of a sintered iron. The armature 460 further includes a hardened steel conically shaped closure element 552, which may be press-fit therein.

Positioned within the lower bore 514 of the retainer 510 is a poppet valve 560 forming therewith a chamber 515. The poppet valve includes an axial wall 562 and a thinner cross member 563. The cross member includes a narrow bleed passage 564 which is preferably narrower than the passage 518 formed in the retainer 510. The poppet valve 560 includes an annular groove 566 for receipt of a dynamic seal such as a piston ring 568. The cross member 563 and wall 562 form a shoulder upon which to receive an optional spring 570 to bias the poppet valve 560 upon the seat 504.

With the coil deactivated, and the strut and piston moving downwardly to compress the fluid in the lower chamber 24 such compressed fluid is also communicated upwardly through passage 502 to the lower surface of the poppet valve 560. Thereafter, the pressurized fluid migrates through the bleed passage 564 and into the upper portion of the bore 514. As can be seen from FIG. 4, the effective area of the upper portion of the poppet valve formed by the cross member 563 and wall 562 is greater than the area of the lower portion of the poppet valve, interior of the valve seat 504, exposed to the fluid in the lower cavity 24. As such, a pressure force differential is created urging the poppet valve 560 onto its seat thereby prohibiting any additional flow between the upper and lower chambers. During this time the flap valve 436 restricts flow through passage 480 to establish a HIGH damping of the shock absorber.

If, during the time that the shaft 406 is moving downwardly it is desired to reduce the damping characteristics of the shock absorber from that established by the flap valve 436, the coil 450 is actuated. Upon activation of the coil 450 the armature 460 is urged toward the stator 426 opening passage 518 and communicating the chamber 514 to the upper chamber 22 through the relief passage 524, opening 530 and passage 482. Upon opening passage 518, the fluid pressure within the chamber 514 is reduced. In response to the pressure force the poppet valve 560 is urged upwardly from the valve seat 504 permitting a relatively large amount of fluid to flow from the lower chamber 24 through passage 502, the openings 567 in the retainer, opening 530 and passage 482.

If the strut 406 is moved upwardly, the fluid in the upper cavity 22 is compressed. With the coil deactivated, passage 518 is closed by operation of the closure element 552. Fluid within the bore 514 is permitted to bleed into the lower cavity 24 through the bleed passage 564 thereby stabilizing the fluid pressure acting on the top portion of the poppet valve to substantially that of the fluid pressure within the lower cavity. The now increased fluid pressure of the upper chamber 22 is communicated to the outer portion of the poppet valve which extends beyond the valve seat 504 urging same off of the valve seat 504 permitting an increased rate of fluid flow between the upper and lower chambers through passage 502 thereby decreasing the damping characteristics of the shock absorber. In order to increase such damping characteristics during upward strut motion, the coil 450 is activated permitting the higher pressure upper chamber fluid pressure to be communicated to the upper portions of the poppet valve 560 through the passage 518. As can be seen, the pressure forces acting across the poppet valve 560 are substantially higher on top and consequently the spring 572 urges the poppet valve once again onto its seat thereby prohibiting further flow between the upper and lower chambers through passage 502. Consequently, the damping of the shock absorber will revert to the high level of damping as established by the flap valve 490 which provides a restriction to the flow of fluid through the passage 482.

FIG. 5 illustrates an alternate embodiment of the invention and more specifically illustrates another solenoid vale 200 for use with the shock absorber 10. Similar structural items in FIG. 4 are identified with like numerals as used in FIG. 2. As will be seen from the description below one of the prime differences of the valve of FIG. 4 and the valve of FIG. 2 is in its failure mode. Typically solenoids will fail such that the armature cannot be retracted. In the case of the valve of FIG. 2 such failure mode will result in the shock absorber having a low damping ratio in extension and a high damping ratio in compression. The solenoid valve of FIG. 5 permits the designer to provide a shock absorber having the reverse failure characteristics and one which also operates in a reverse manner. Upon comparison of FIGS. 2 and 5 it can be seen that the solenoid valves also differ in the design of the poppet valve. More particularly, the poppet valve 202 of the FIG. 5 comprises a cup-shaped member 202 having a bottom 204 and walls 206 which axially extend towards the flux plate 94. The length of the wall 202 is chosen such that when the poppet valve 202 is positioned upon the seat 148 a gap 210 is created, such gap being less than the air gap 130. The bottom 204 contains a first narrow passage 212 and a second somewhat wider passage 214, the top of which forms a valve seat 216 for receiving the ball 174. The armature 100 is biased downwardly by a first spring 108. Positioned about the first spring is a second spring 220 for biasing a poppet valve 202 away from the flux plate 94 into engagement with the valve seat 148. The table below summarizes the operational states of the shock absorber 10 using the solenoid 200.

| MOTION | VALVE 200 | EFFECTIVE DAMPING |
|---|---|---|
| Extension | OFF | LOW |
|  | ON | HIGH |
| Compression | OFF | HIGH |
|  | ON | LOW |

With the shock absorber in extension, that is, with the piston 30 moving upwardly the pressure of the hydraulic fluid within the upper chamber 22 will increase. If the solenoid valve 200 is not energized (OFF) the pressure within the chamber 230, formed between the poppet valve 202 and flux plate 94, will increase creating a pressure differential to maintain the poppet valve on the valve seat 148. If the armature 100 is moved away from the valve seat 216, i.e. when activated, the pressure within chamber 230 will rapidly reduce by virtue of the fluid flow through the larger passage 214 thereby creating a pressure differential across the bottom of the poppet valve 202 sufficient to urge it upwardly, as viewed in FIG. 4, against the bias force of spring 220. In certain high pressure instances the poppet valve 202 would have tendency to move upwardly against the ball 174 thereby terminating flow through passage 214. This condition is prevented by using the longer length walls 206 which restrict the upward motion of the poppet valve 202 to be less than the upward motion of the armature 100.

Upon moving the poppet valve off from the valve seat the damping of the shock absorber is reduced by virtue of the increased flow between chambers 22 and 24. If the shock absorber is in compression, that is, with the piston 30 moving downwardly the fluid pressure within the lower chamber 24 increases. If the solenoid valve is de-energized (or OFF) the armature 100 will prohibit flow through the passage 214. During this time the pressure of the fluid within the chamber 230 will migrate to the lower pressure of the upper chamber 22 creating a pressure differential across the bottom 204 of the poppet valve 202 such that the poppet valve and armature 100 are moved up simultaneously. This action permits a large volume of fluid to flow between the chambers 24 and 22. Upon exciting the valve 200, the armature 100 permits fluid communications through passage 214 into chamber 230. By virtue of the fact that passage 212 is narrower than passage 214 the pressure within the chamber 230 will build thereby urging the poppet valve 202 to once again seat upon the valve seat 148, restricting the flow through the valve and permitting the shock absorber to operate at the high damping ratio as established by the flap valve 26.

Many changes and modifications in the above described embodiment of the invention can, of course, be carried out without departing from the scope thereof. Accordingly, that scope is intended to be limited only by the scope of the appended claims.

I claim:

1. A shock absorber for a vehicle comprising:
   a casing, a hollow strut reciprocatively received in the casing, a piston including an opening, carried by the strut for dividing the interior of the casing into upper and lower chambers containing fluid, a plurality of flap valves for damping in concert with other openings in the piston motion of the strut at determinable levels in extension and compression, the strut further including a cross-hole for communicating fluid to and from the upper chamber and its interior,
   means for selectively reducing the damping of the strut from the predetermine levels comprising:
   solenoid valve means positioned within and carried by the strut comprising:
   a main valve including an armature movable in responsive to an electromagnetic force to selectively open and close a first flow passage defining a first valve seat at one end thereof, the first flow passage being formed within a cross-member of a retainer, the retainer cooperating with the interior of the strut to define a first fluid chamber about the armature and a second fluid passage for permitting fluid to flow to and from the first fluid chamber,
   the retainer further includes a wall defining an open end, which is recessed from the interior of the strut and which extends axially away from the cross-member;
   the solenoid valve means further comprises a valve seat member defining a lower passage for communicating fluid between the lower chamber, through the piston, into the interior of the strut, including at one end thereof a second valve seat;
   a poppet valve, movable in response to a pressure differential thereacross, relative to the second valve seat for controlling the flow of fluid through the lower passage, including a cylindrical wall slidably received in the retainer wall, a bottom formed at one end of the cylindrical wall including a narrow bleed passage therethrough, the bleed passage being narrower than the second fluid passage of the retainer;
   the retainer and poppet valve cooperates to define a pressure chamber therebetween, wherein when the pressure of the fluid in the lower chamber is greater than the pressure in the upper chamber and with the armature deactivated and positioned on the first valve seat fluid within the lower chamber is permitted to migrate through the bleed passage into the pressure chamber to develop a force on the poppet valve urging it onto the second valve seat,
   when the armature is activated and positioned off of the first valve seat fluid in the pressure chamber is communicated to the first chamber creating a pressure differential across the poppet valve urging it off from the second valve seat permitting flow from the lower chamber to the upper chamber to thereby lesen the damping of the strut from the determinable levels;
   when the pressure in the upper chamber is greater than the pressure in the lower chamber, with the armature deactivated and positioned on the first valve seat to prohibit flow through the second fluid passage, the increased pressure fluid acts upon the bottom of the poppet valve to urge same from the second valve seat to permit flow fluid to flow from the upper chamber to the lower chamber through lower passage in the valve seat member to reduce the damping of the strut and with the armature activated and position off of the first valve seat pressurized fluid is permitted to flow through the second fluid passage into the pressure chamber to urge the poppet valve onto the second valve seat to restrict flow through the lower passage.

2. The shock absorber as defined in claim 1 wherein said reducing means includes means for generating a first signal indicative of the vertical acceleration of the vehicle and means for deriving, from the first signal, a second signal indicative of vertical velocity,
   and means for generating a control signal to activate the armature during instances when the second signal is positive to cause the armature to move off of the first valve seat.

3. The shock absorber as defined in claim 2 wherein the reducing means further includes means for terminating the control signal during instances when the second signal is not positive.

4. The shock absorber as defined in claim 3 wherein said second signal is not generated if its magnitude is within a dead band.

5. A shock absorber comprising a piston which divides a casing into a lower and an upper fluid chambers, the piston operatively connected to a hollow strut, which includes a cross-hole linking the upper chamger to its interior,
   means for damping the motion of the piston for regulating the rate at which fluid is permitted to flow between the fluid chambers, such rate being adjustable between a low flow mode and a high flow mode;
   the regulating means including flap valves movable with the piston, for restricting the fluid flow in concert with openings in the piston to predetermined levels during the low flow mode to relatively highly damp the motion of the piston and means for selectively increasing the flow, in response to a control signal, to reduce the damping of the piston during the high flow mode wherein the increase flow means comprises a solenoid valve positined within and carried by the strut comprising:
- a retainer including a first cylindrical wall spaced from the interior of the strut to form an annular fluid passage in communication with the upper chamber through the opening in the strut;
- the retainer further defines a first chamber into which is received an armature movable relative to a first flow passage formed in the retainer, for selectively enabling flow between the first chamber and a pressure chamber formed within the cylindrical wall, and a second flow passage between the annular fluid passage and the first chamber;
- a cup-shaped poppet valve, slidably received in the cylindrical wall including a bottom which forms a movable wall of the pressure chamber, the bottom including a bleed passage therethrough;
- the bottom adapted to seat upon a valve seat member which defines a valve seat formed at one end of a lower passage communicating the bleed passage to the lower chamber;
- the bottom is sized to radially extend beyond the valve seat such that the extending portion of the bottom is exposed to the fluid in the annular fluid passage;
- wherein the increased flow between the upper and lower chambers is achieved during periods when the pressure in the upper chamber is greater than the pressure in the lower chamber, by communicating the upper chamber fluid to the bottom of the poppet valve and permitting the fluid within the pressure chamber to bleed therefrom through the bleed passage to the lower chamber thereby creating a pressure differential tending to lift the poppet valve off from the seat, and
- during instances when the pressure within the lower chamber exceeds that of the upper chamber the armature is moved off from the first flow passage to communicate the pressure chamber to the upper chamber thereby creating a pressure differential across the poppet valve tending to lift it from the valve seat.

6. The shock absorber as defined in claim 5 wherein the effective surface area of the bottom, exposed to fluid pressure from the pressure chamber, is greater than the flow area of the lower passage.

7. The shock absorber as defined in claim 6 wherein the poppet valve is remotely positioned from the armature.

8. The shock absorber as defined in claim 7 wherein the armature is movable in response to a magnetic field generated by a coil operatively coupled to the armature.

9. The shock absorber as defined in claim 8 wherein the poppet valve is spring biased against the retainer on to the valve seat.

10. A shock absorber comprising:
- a casing, a hollow strut reciprocatively received in the casing, a piston assembly joined at one end to the hollow strut including a piston housing slidably received in the casing for dividing the casing into upper and lower fluid filled chambers, and including first seal means for forming a dynamic seal therebetween, the piston assembly further including a plurality of through passages communicating the upper and lower chambers, first flap valve means for damping the motion of the piston assembly, at a predetermined value, as the piston moves to compress the fluid in the lower chamber, the first flap valve means operative to restrict the flow of fluid between the chambers through a first of the passages; during instances where the piston is compressing the fluid in the lower chamber and operative to prohibit such flow when the piston is compressing fluid in the upper chamber;
- second flap valve means for damping the motion of the piston assembly in an opposite, second direction, at a predetermined value, the second flap valve operative to restrict the flow of fluid between the chambers through a second of the passages during instances when the piston is compressing the fluid in the upper chamber and to prohibit such flow when the piston is compressing the fluid in the lower chamber;
- said piston housing further including first and second opposing bores, the bores separated by a cross member defining an opening, the second bore communicated to the second passage through an aperture responsive to control signals, comprising an electric coil wound about a bobbin disposed within the first bore including a central passage coaxially disposed relative to the opening in the cross member;
- an armature reciprocatively received through the opening of the cross member and partially received within the passage of the bobbin;
- a retainer received into the second bore, including a third bore proximate the opening, an oppositely extending fourth bore and a second cross member separating the third and fourth bores, the second cross member including a third passage one end of which, adjacent the third bore, terminates in a first valve seat; the fourth bore being formed by an axially extending cylindrical wall spaced from the interior of the second bore defining an annular passage therebetween; the cylindrical wall including openings proximate an end thereof, and a relief passage, therethrough communicating the annular passage and third bore;
- valve seat assembly received within the second bore in abutting relation to the end of the cylindrical wall, including a flow passage communicated to the lower chamber the valve seat assembly and retainer cooperating to define a chamber, the valve seat assembly including a second valve seat extending into the chamber;
- a first spring for urging the armature into sealing engagement with the first valve seat;
- a substantially flat poppet valve slidably received within the chamber including second seal means for forming a dynamic seal therebetween and a bleed passage therethrough in communication with the flow passage.

11. The shock absorber as defined in claim 10 wherein the armature is movable through a gap relative to a stator and includes means for communicating the gap to the third bore.

12. The shock absorber as defined in claim 11 wherein the second valve seat defines an upraised annular flat seating surface.

13. A shock absorber comprising:
- a piston assembly reciprocatively received in a casing for dividing same into upper and lower chambers, the piston assembly including a piston housing comprising two remotely located passages linking the upper and lower chambers;

means for selectively restricting fluid flow through first and second of the two passages, at determinable levels, in correspondence with the relative motion between the casing and piston assembly;

means responsive to control signals, for selectively increasing fluid flow between the upper and lower chambers above that established by the restricting means through one of the two passages to decrease the fluid damping acting upon the piston assembly; wherein the piston housing includes a lower bore, a retainer received within the lower bore including an axially extending wall spaced from such bore to define an annular space therebetween, a valve seat member including an annular valve seat received within the lower bore in abutting relation to ends of the wall and defining in cooperation with the retainer a chamber, the valve seat member including a through passage to the lower chamber, a poppet valve, positioned within the chamber, including means for slidably and sealingly engaging inner portions of the wall, including a narrow bleed passage communicating the chamber and the through passage, the poppet valve adapted to seat upon the valve seat to substantially seal the through passage, a portion of the poppet valve radially extending beyond the valve seat; and wherein the increasing means comprises:

means for communicating fluid to the extending portion of the poppet valve and into the chamber for creating a pressure force differential across the poppet valve for urging same off of or onto the valve seat in correspondence with the motion of the piston assembly.

14. The shock absorber as defined in claim 13 wherein the communication means includes a third passage communicating a first of the plurality of passages to the annular passage and first passage means for communicating the annular passage to the extending portion of the poppet valve.

15. The shock absorber as defined in claim 14 wherein the first passage means includes a plurality of passages formed in the lower extreme of the wall, a flow passage formed in the retainer extending into the chamber opposite from the bleed passage and a second passage means communicating the annular space to the flow passage, and wherein the increasing means further includes:

control means for opening and closing the flow passage.

16. The shock absorber as defined in claim 15 wherein the control means includes an armature for selectively sealing the flow passage.

17. The shock absorber as defined in claim 16 wherein the armature is reciprocated with an internal chamber relative to a stator through a gap, wherein the internal chamber is intersected by the flow passage and second passage means and wherein the armature includes third passage means for communicating the gap to the internal chamber.

18. The shock absorber as defined in claim 17 wherein sealing means of the poppet valve includes a piston ring.

* * * * *